(12) United States Patent
Frascati et al.

(10) Patent No.: US 8,490,313 B2
(45) Date of Patent: Jul. 23, 2013

(54) APPARATUS FOR MOUNTING ACCESSORIES ON THE ACCESSORY RAIL OF A WEAPON

(75) Inventors: Joseph Frascati, Arlington, VA (US);
Ben Feldman, Reston, VA (US); James S. Dodd, Linden, VA (US); Hector Tapia, Ashburn, VA (US); Greg Paulsen, Ashburn, VA (US)

(73) Assignee: Prototype Productions Incorporated Ventures Two, LLC, Ashburn, VA (US)

( * ) Notice: Subject to any disclaimer, the term of this patent is extended or adjusted under 35 U.S.C. 154(b) by 0 days.

(21) Appl. No.: 13/008,333

(22) Filed: Jan. 18, 2011

(65) Prior Publication Data

US 2012/0180363 A1    Jul. 19, 2012

(51) Int. Cl.
*F41A 15/00*    (2006.01)

(52) U.S. Cl.
USPC ...... 42/90; 42/71.01; 42/72; 42/84; 42/75.03; 42/85

(58) Field of Classification Search
USPC ............. 42/85, 71.01, 72, 84, 75.03, 90
See application file for complete search history.

(56) References Cited

U.S. PATENT DOCUMENTS

| | | | |
|---|---|---|---|
| 4,934,085 A * | 6/1990 | Lough | 42/127 |
| 5,430,967 A * | 7/1995 | Woodman et al. | 42/114 |
| 6,438,888 B1 * | 8/2002 | Lin et al. | 42/114 |
| 6,606,813 B1 | 8/2003 | Squire et al. | |
| 6,922,934 B1 * | 8/2005 | Huan | 42/127 |
| 7,308,772 B1 * | 12/2007 | Millett | 42/127 |
| 7,685,759 B2 * | 3/2010 | Teetzel | 42/127 |
| 7,735,255 B1 * | 6/2010 | Kincaid et al. | 42/146 |
| 7,802,395 B1 * | 9/2010 | Swan | 42/127 |
| 7,886,476 B1 * | 2/2011 | Swan | 42/127 |
| 7,905,045 B1 * | 3/2011 | Swan | 42/127 |
| 7,908,782 B1 * | 3/2011 | LaRue | 42/128 |
| 7,975,419 B2 * | 7/2011 | Darian | 42/84 |
| 8,056,277 B2 * | 11/2011 | Griffin | 42/71.01 |
| 8,091,265 B1 * | 1/2012 | Teetzel et al. | 42/72 |
| 8,104,211 B2 * | 1/2012 | Darian | 42/90 |
| 8,112,933 B1 * | 2/2012 | Swan | 42/127 |
| 8,132,355 B1 * | 3/2012 | Kincaid et al. | 42/124 |
| 2001/0022044 A1 * | 9/2001 | Spinner | 42/124 |
| 2003/0101632 A1 * | 6/2003 | Davenport et al. | 42/85 |
| 2008/0034638 A1 | 2/2008 | Spuhr | |
| 2010/0107467 A1 * | 5/2010 | Samson et al. | 42/127 |
| 2010/0229449 A1 | 9/2010 | Matthews et al. | |
| 2010/0229450 A1 | 9/2010 | Becker et al. | |

(Continued)

OTHER PUBLICATIONS

International Search Report in related PCT Application No. PCT/US2011/068106 dated May 1, 2012, 3 pages.

*Primary Examiner* — Michelle Clement
(74) *Attorney, Agent, or Firm* — Patton Boggs LLP

(57) ABSTRACT

The Accessory Mounting Apparatus uses a quick release clamp for mounting and securely attaching accessories to a dove-tail shaped accessory rail. This apparatus allows for quick assembling and disassembling of accessories and tactical equipment on a weapon accessory rail system. The Accessory Mounting Apparatus consists of a base, latching arm, and over-centered lever to apply clamping force, where the base of the clamping device is keyed to align with a dove-tail shaped rail and fix its location in the direction of the barrel. The latching arm is slid over the dovetail in the accessory rail and the over-centered lever is closed to clamp the device securely around the accessory rail, fixing it in all directions.

9 Claims, 11 Drawing Sheets

U.S. PATENT DOCUMENTS

2011/0061286 A1* 3/2011 Wang .............................. 42/125
2011/0173865 A1* 7/2011 Compton et al. ................. 42/84
2011/0283585 A1* 11/2011 Cabahug et al. ................. 42/73

* cited by examiner

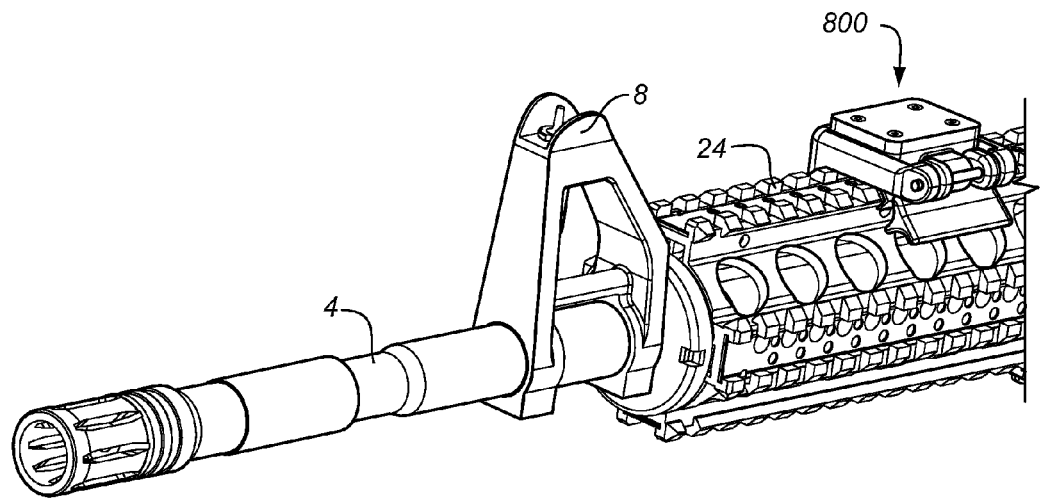
FIG. 1C
FIG. 1D
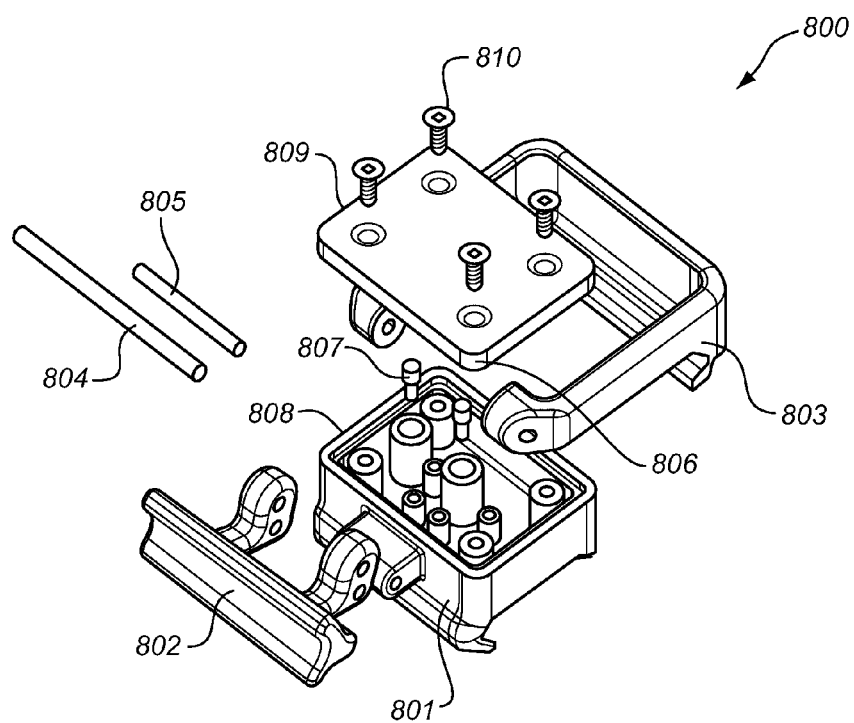

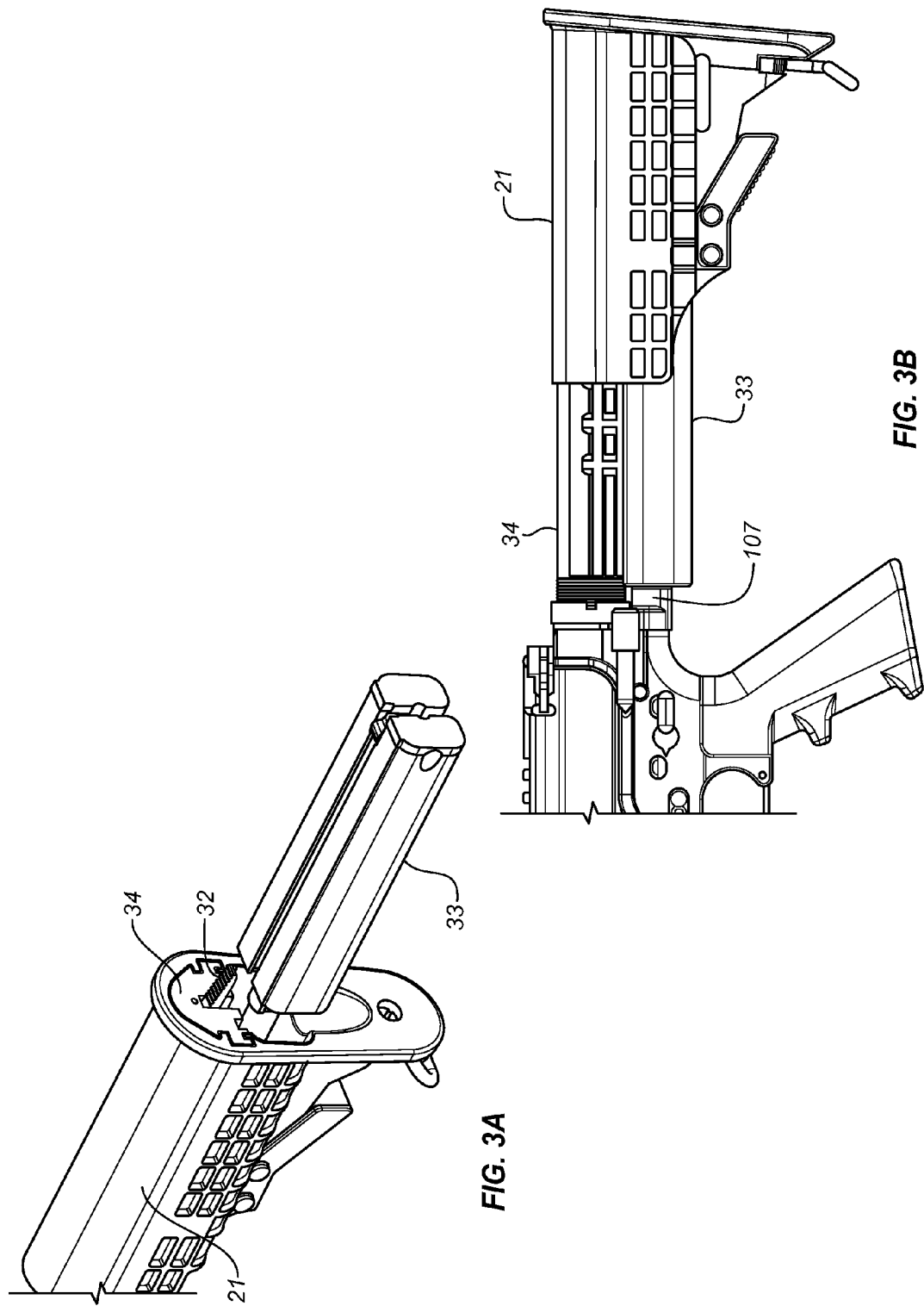

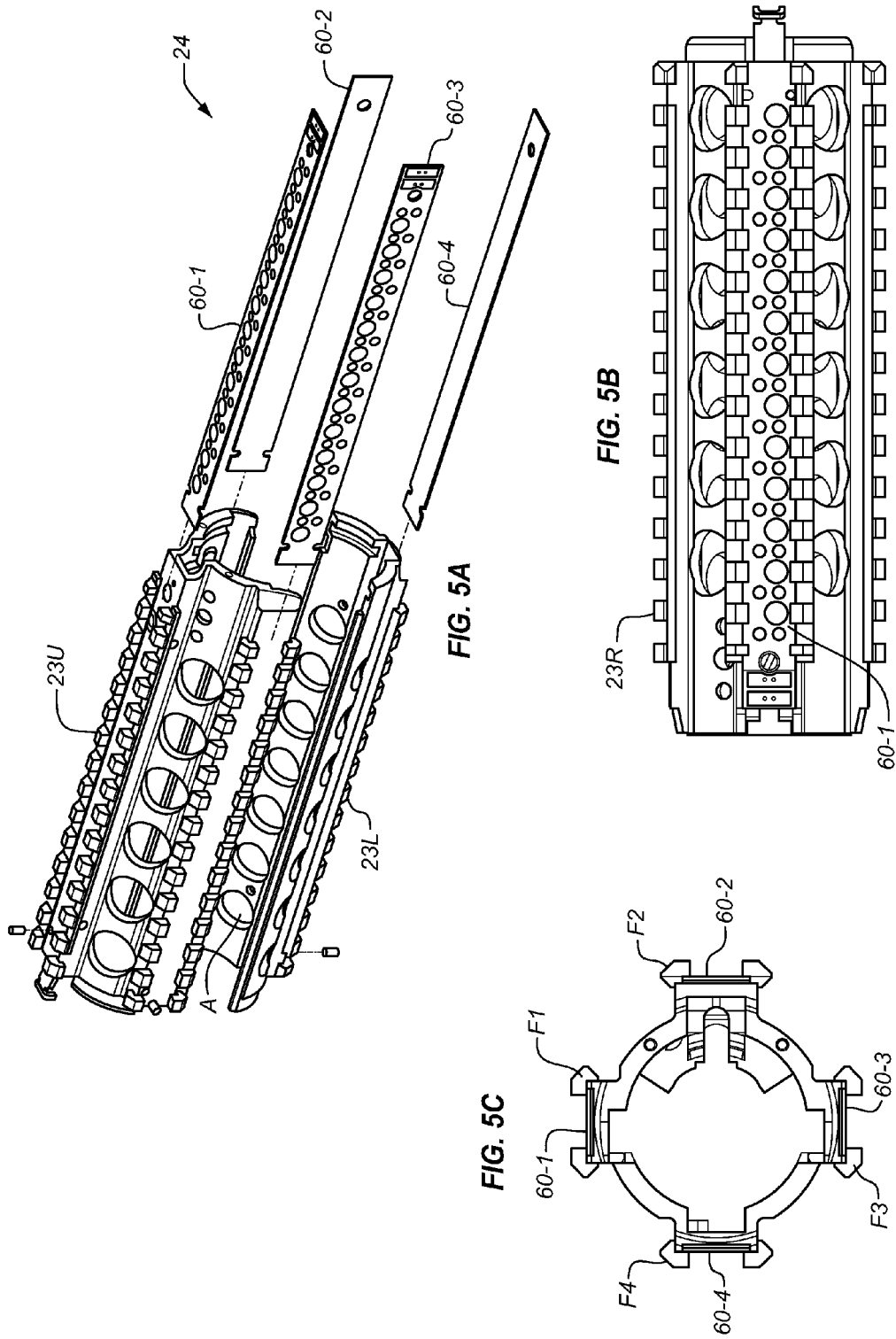

APPARATUS FOR MOUNTING ACCESSORIES ON THE ACCESSORY RAIL OF A WEAPON

FIELD OF THE INVENTION

The invention relates generally to the field of accessory mounting apparatus for use with a rail of a weapon to mechanically interconnect an accessory to the rail.

BACKGROUND OF THE INVENTION

It is a problem to simply attach accessories to a weapon in an environmentally hostile environment. The typical adverse natural environment includes, but is not limited to, corrosion, chemical contamination, extreme temperatures, humidity, rain, dirt, ice, and abrasion. In addition, the usage environment can be a combat scenario, where the mechanical mounting of the accessory to the weapon must be done in a simple, rapidly implemented, and accurately positioned manner.

The traditional approach to mounting an accessory to a weapon is to use a rail which is mounted along the length of the barrel of the weapon. The rail typically comprises a series of ridges with a T-shaped cross-section interspersed with flat "locking slots" (also termed "recoil groove"). Accessories are mounted on the rail either by sliding them on from one end of the rail or the other end of the rail by means of a "rail-grabber", which is clamped to the rail with bolts, thumbscrews, or levers, or onto the slots between the raised sections.

Each accessory, therefore, includes two inwardly-facing surfaces of a size and shape to mate with the contours of the rail. A first of the two inwardly-facing surfaces is generally fixed or part of the body of the accessory mounting apparatus and engages a first side of the rail, while the second inwardly-facing surface is movable with respect to the first and is forced into engagement with a second side of the rail by the use of bolts or a thumbscrew. The pressure applied by the bolts or thumbscrew holds the accessory mount and its supported accessory secured against the rail in the selected position along its length.

The use of a manually operated bolt or thumbscrew creates a problem in cold weather situations, where the user is wearing heavy gloves and may have a difficult time turning the bolt or thumbscrew.

In addition, the two inwardly-facing surfaces must be spread apart a sufficient distance to clear the width of the rail, then closed together via numerous turns of the bolt or thumbscrew. The second inwardly-facing surface must be held in position against the rail with one hand while the user works the bolt or thumbscrew to pull the two inwardly-facing surfaces against the respective sides of the rail.

Thus, this method of mounting accessories on the weapon is cumbersome at best.

BRIEF SUMMARY OF THE INVENTION

The above-described problems are solved and a technical advance achieved by the present Apparatus For Mounting Accessories On The Accessory Rail Of A Weapon (termed "Accessory Mounting Apparatus" herein) which is adapted for use in weapons, such as military weapons. A firearm used in military applications may have a plurality of accessories that can be attached to the weapon, where the mechanical mounting of the accessory to the weapon must be done in a simple, rapidly implemented, and accurately positioned manner. The Accessory Mounting Apparatus uses a quick release clamp for mounting and securely attaching accessories to, for example, a dove-tail shaped accessory rail. This apparatus allows for quick assembling and disassembling of accessories and tactical equipment on a weapon accessory rail system. The Accessory Mounting Apparatus consists of a base plate, a body, latching arm, and over-centered lever to apply clamping force, where the body of the clamping device is keyed to align with a dove-tail shaped rail and fix its location in the direction of the barrel. The latching arm also is keyed to align with a dove-tail shaped rail and, to secure the accessory to the accessory rail, it is slid over the dovetail in the accessory rail and the over-centered lever is closed to clamp the Accessory Mounting Apparatus securely around the accessory rail, fixing it in all directions.

The accessories used with weapons are frequently power-consuming accessories which need electric power. In order to reduce the weight of these power-consuming accessories, as well as the proliferation of batteries used to power these power-consuming accessories, a common power source is used to power whatever power-consuming accessory is attached to the weapon. A Weapon Accessory Power Distribution System provides one or more powered rails to provide a point of mechanical and electrical interconnection for the power-consuming accessories to provide quick connect mounting and dismounting of the power-consuming accessory, absent the use of connectors with their tethering cables, which are susceptible to entanglement. Therefore, the following description provides a disclosure of the Weapon Accessory Power Distribution System in sufficient detail to understand the teachings and benefits of the Accessory Mounting Apparatus as used in this environment. The disclosed Accessory Mounting Apparatus includes contacts for electrically connecting to an accessory rail which provides powered contacts connected to a power source. However, the Accessory Mounting Apparatus need not be used exclusively for power-consuming accessories and can be used simply to provide a mechanical interconnection to an accessory to the accessory rail of a weapon, with the basic architecture and implementation of the Accessory Mounting Apparatus being delimited by the appended claims.

BRIEF DESCRIPTION OF THE DRAWINGS

FIGS. 1A-1H are illustrations of various views of the Accessory Mounting Apparatus which provides mechanical interconnection and electrical interconnection of a Power-Consuming Accessory to the Powered Rail of a weapon;

FIGS. 3A and 3B are illustrations of a typical butt stock battery pack of the Weapon Accessory Power Distribution System;

FIGS. 5A-5C are illustrations of the Handguard assembly, including the Powered Rail, of the Weapon Accessory Power Distribution System;

FIGS. 6A and 6B are plan and perspective views, respectively, of two implementations of the Powered Rail, while

DETAILED DESCRIPTION OF THE PREFERRED EMBODIMENT

Weapon Equipped with Weapon Accessory Power Distribution System

Figure 2A:
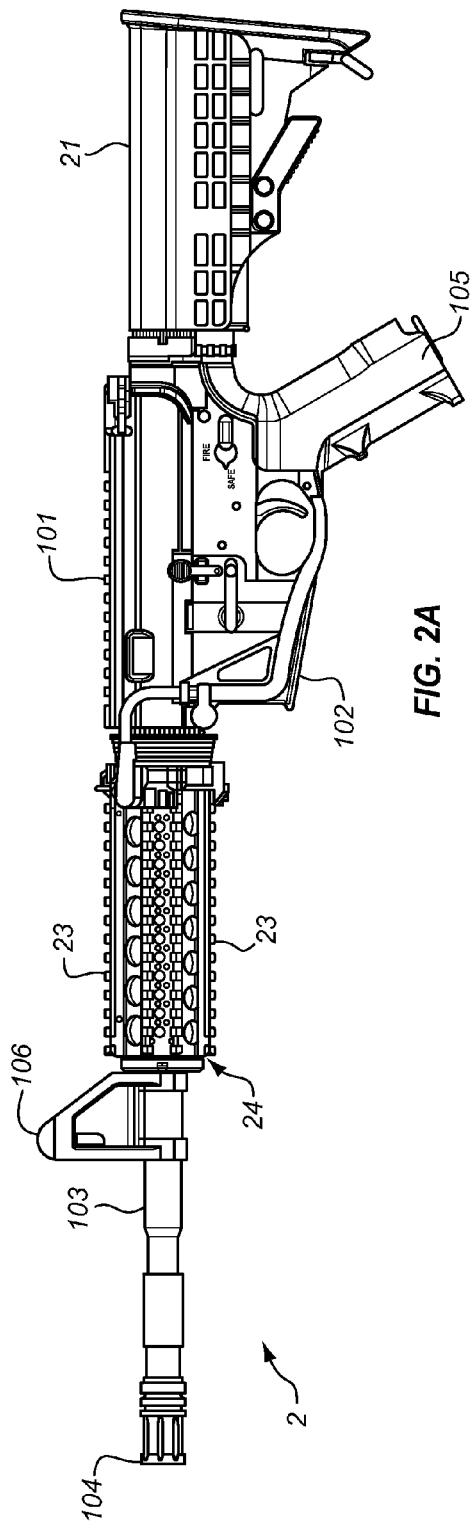
FIGS. 2A and 2B are illustrations of the system architecture of a military style weapon equipped with a Weapon Accessory Power Distribution System.
Figure 2B:
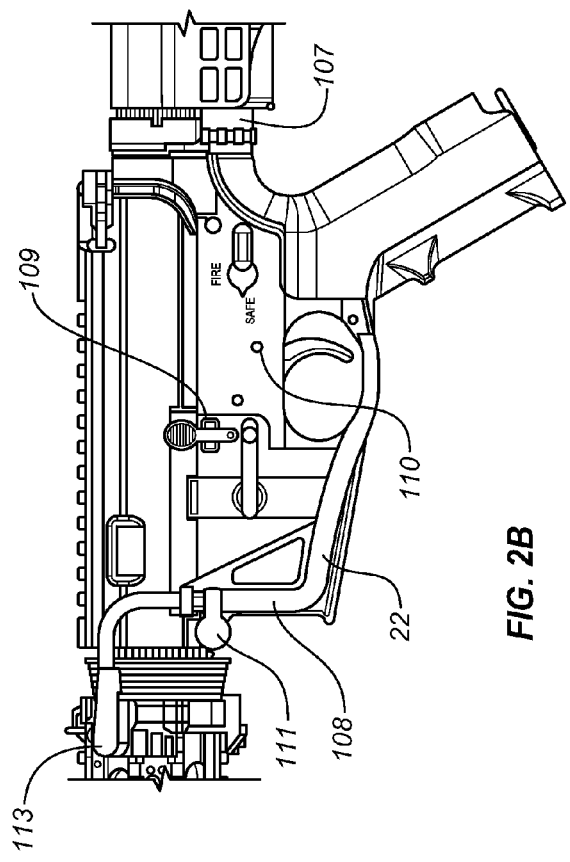
Figure 4A:
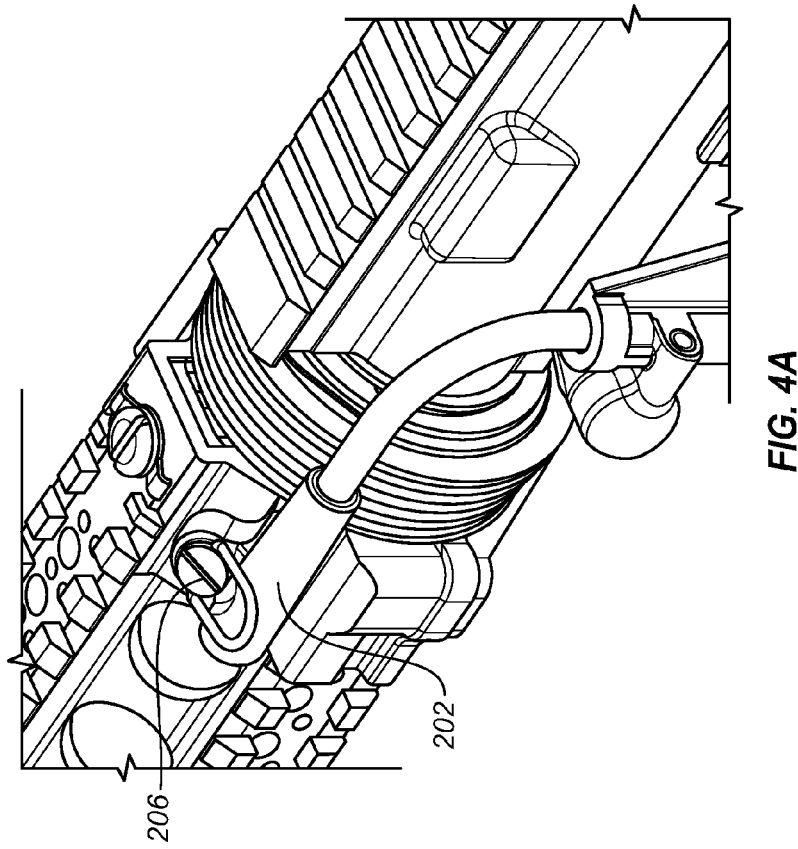
FIGS. 4A-4C are illustrations of the Power Distribution System which interconnects the Battery Pack to the Powered Rail in the Weapon Accessory Power Distribution System.
Figure 4B:
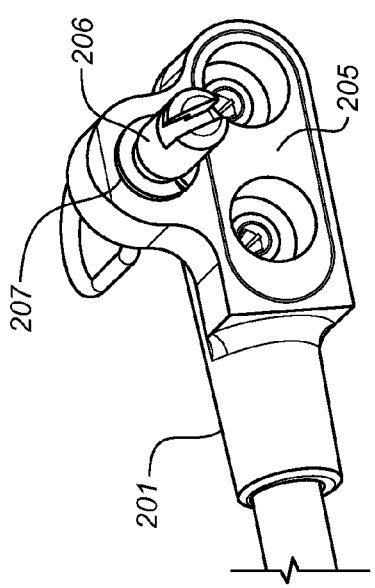
Figure 4C:
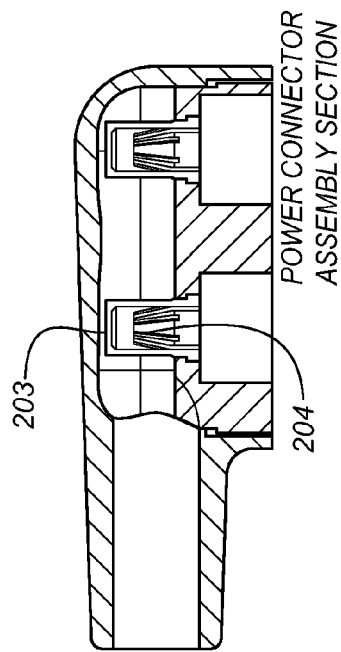

FIGS. 2A and 2B are illustrations of the system architecture of a military style weapon 2 equipped with a Weapon Accessory Power Distribution System. The primary components of the basic Weapon Accessory Power Distribution System are:

Butt Stock 21 with Battery Pack 33 (shown in FIG. 3A);
Power Distribution System 22;
Handguard 23 (optional);
Powered Rail 24; and
Powered Accessory Mounting 800 (shown in FIGS. 1A-1H).

The existing military-style weapon 2 includes in well-known fashion an upper receiver 101, lower receiver 102, barrel 103, muzzle 104, grip 105, and front sight 106. While a military-style weapon is described herein, the teachings of this application are equally applicable to other firearms, such as handguns, fixed mount machine guns, as well as non-Weapon based systems. The Weapon Accessory Power Distribution System is added to this standard military-style weapon 2 as described herein.

The Handguard 23 performs the barrel shielding function as in the Picatinny Rail as noted below, but has been modified, as shown in FIGS. 2A and 2B to accommodate the Powered Rail 24 and electrical interconnection of the Powered Accessory Mounting 800 to the Powered Rail 24, as described below. In particular, a combination of Powered Rails 24 and Handguard sections 23 are attached together to form a structure which encircles the barrel 103. The Powered Rails 24 in effect forms facets around the periphery of the resultant Handguard structure. Thus, herein the term "Handguard" is used to represent the sections of handguard structure as well as the well-known combination of Handguard sections and Powered Rails which encircle the barrel 103 as shown in FIGS. 2A and 2B. As alternative structures, the Powered Rail 24 can be attached to a Handguard 23 that encircles the barrel. Furthermore, there is no requirement to use the Handguard 23 as an integral component of the Weapon Accessory Power Distribution System, so the Handguard 23 can be optional, with the Powered Rail(s) 24 being attached to the weapon in some other manner, such as an upper receiver rail 101 in FIG. 2A. For the purpose of illustrating the Weapon Accessory Power Distribution System, the first of the above-listed configurations is used herein.

Handguard

As noted above, the Handguard 23 was developed to shroud the barrel 103 of a rapid fire weapon 2 to enable the person firing the weapon 2 to grip the forward portion of the weapon 2 while mitigating the possibility of burning the hand of the person firing the weapon 2, yet also providing adequate cooling for the barrel 103 of the weapon. Handguards find application in rifles, carbines, and fixed mount Weapons, such as machine guns. However, the Weapon Accessory Control System can also be used in modified form for handguns, as an accessory mounting platform, and as an accessory power source.

FIGS. 5A-5C are perspective exploded view, side view, and end view illustrations, respectively, of the Handguard 23 assembly, including the Powered Rail 24, of the Weapon Accessory Control System. The Powered Rail 24, as shown as an example, includes a series of ridges with a T-shaped cross-section interspersed with flat "spacing slots". This version of the Handguard 23 includes one or more power distribution Printed Circuit Boards 60-1 to 60-4, with FIG. 5C showing an end view of the slots formed in the various facets F1-F4 of the Handguard 23. Apertures A are provided along the length dimension L of the Handguard 23 to enable the barrel 103 of the weapon 2 to be cooled by air circulation from the ambient environment. Other Powered Rail configurations are possible, and this architecture is provided as an illustration of the concepts of the Weapon Accessory Power Distribution System.

One or more of the Powered Rail subassemblies (typically Printed Circuit Boards) 60-1 to 60-4 can be inserted into the respective slots formed in the Powered Rail 24 (on the corresponding facets F1-F4 of the Handguard 23) thereby to enable power-consuming accessories to be attached to the Handguard 23 of the weapon 2 via the Powered Rail 24 on any facet F1-F4 of the Handguard 23 and to be powered by the corresponding Printed Circuit Board 60-1 to 60-4 installed in the Powered Rail 24 on that facet.

Battery Pack

The Battery Pack can be implemented in a number of assemblies and mounted on various portions of the weapon (such as on the Powered Rail, or in a pistol grip, or in a remote power source, and the like). For the purpose of this description, FIGS. 3A and 3B are illustrations of a typical Butt Stock 21 with Battery Pack 33 of the Weapon Accessory Control System. For example, a butt stock/recoil tube battery pack assembly includes an adjustable butt stock 21, a cam latch 32, and a removable battery pack 33. The butt stock 21 adds a compartment to the underside of the existing lower receiver extension (also termed "buffer tube" herein) assembly 34 which allows the battery pack 33 to be installed and withdrawn for removal through the rear of the rifle. The battery pack 33 mounts on the buffer tube assembly 34 independent of the butt stock 21 which telescopes along the rifle. The butt stock 21 is adjustable and can be extended in various multiple intermediate positions to provide an adjustable length of the firearm, as is well known in the art. By moving the mass of the battery rearward on the weapon, the time required to bring the weapon to point is reduced, as well as the time needed to "stop" the muzzle when the target is acquired.

Power Distribution System

The Power Distribution System 22 is shown in FIGS. 2A, 2B, and 4A-4C as a one-piece housing 201 and ruggedized power rail connector 202 where sealing integrity is maintained during exposure to adverse environmental conditions. The power rail connector 202 consists of a metallic shell body, contact pin receptacle 203, with a press fit multi-finger spring contact 204 assembled into the contact pin receptacle 203. The multi-finger spring contact 204 provides compliance to variations in the mating pin to ensure continuous current carrying capacity of the connection. The contact pin receptacle 203 includes a solder tail portion for soldering cable wires. The bottom panel insulator 205 mounts the pin receptacles 203 with the bottom part fitted over the connector contact pin receptacle 203 and is sealed with a sealing compound. A fastener 206 and retaining ring 207 are used to secure the connector assembly into the rail pin contacts.

An electric wire is routed from the Battery Pack 33 in the Butt Stock 21 to the Powered Rail 24. The external wiring is housed inside a durable and impact resistant polymer shroud 108 that conforms to the lower receiver 102. The shroud is securely retained by a quick connect/disconnect pivot and takedown pin 111 as well as the bolt release roll pin 109 in the trigger/hammer pins 110. The shrouded power cable runs from the Battery Power Connector 107 at the Butt Stock 21 to the Power Rail Connector 202. This design provides an easy access for replacing or repairing the cable assembly, eliminates snag hazards or interferences with the rifle operation, and requires no modifications to the rifle lower receiver 102 housing.

Powered Rail

The Powered Rail 24 is used to electrically interconnect a power source (Battery Pack 33) with the various accessories mounted on the Powered Rail 24, such that the Powered Rail 24 of the Handguard 23 provides the mechanical support for the accessory, and the Powered Rail 24 also provides the electrical interconnection. In this example, the Powered Rail 24 is attached to and coextensive with the Handguard 23 sections, such that the mounting of a Power-Consuming Accessory on the Powered Rail 24 results in simultaneous mechanical and electrical interconnection.

Figure 6A:
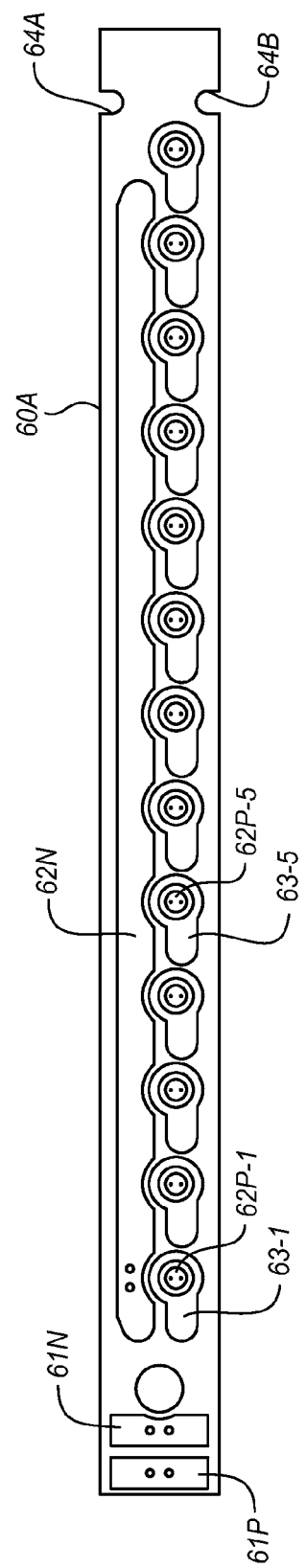
Figure 6B:
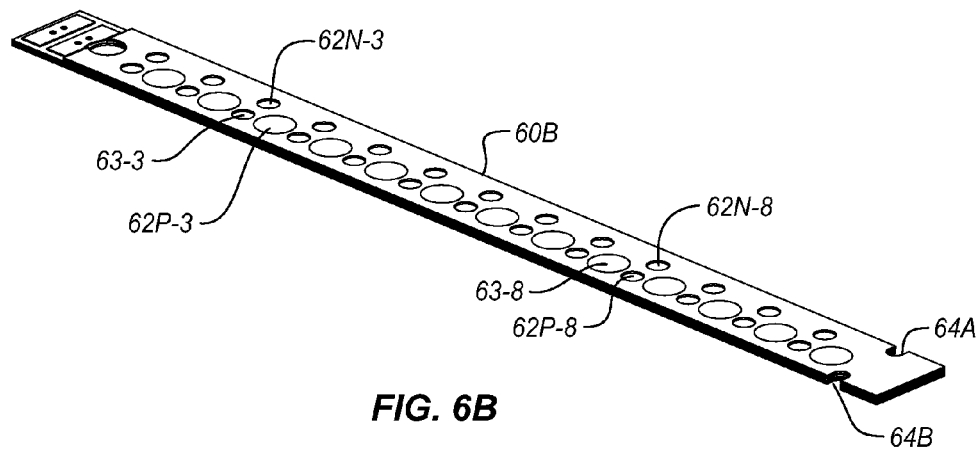
Figure 6C:
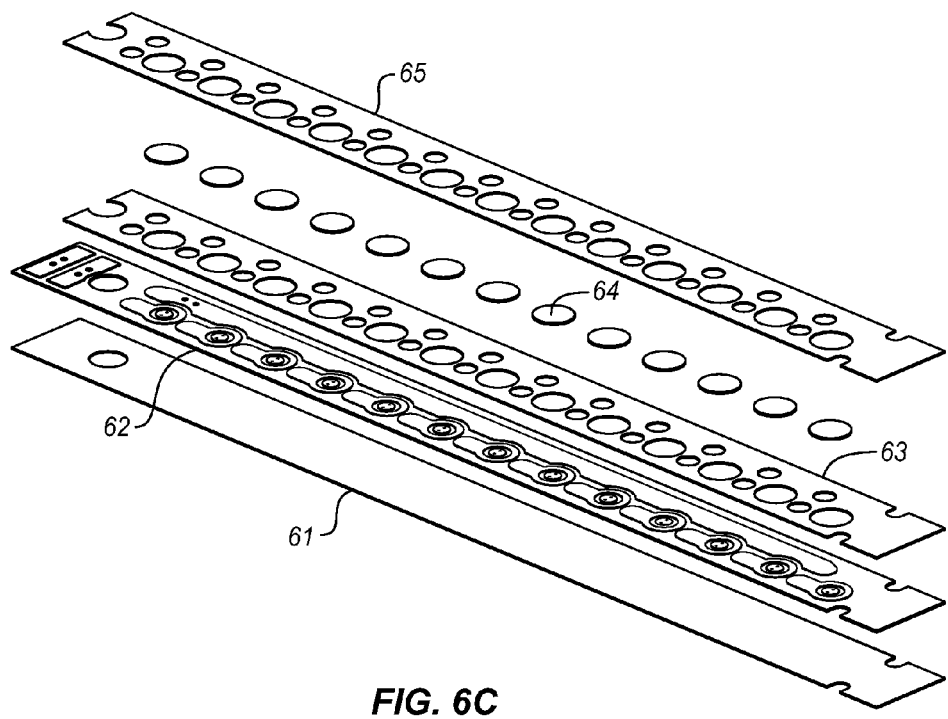
FIG. 6C is an exploded perspective view of the Powered Rail.
Figure 7A:
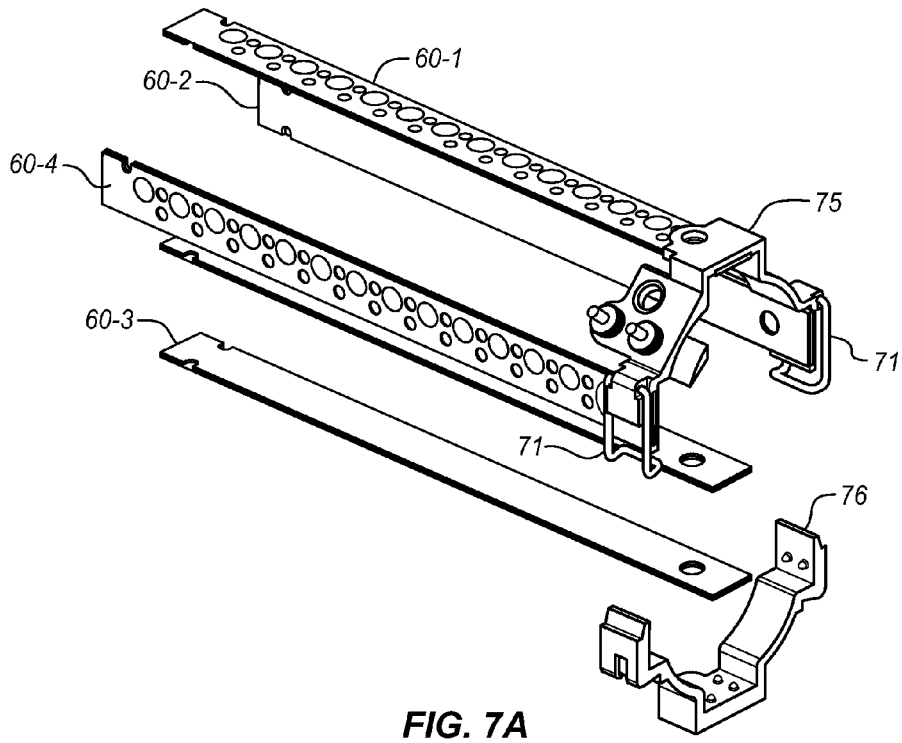
FIGS. 7A-7B illustrate the details of the Powered Rail electrical interconnection.
Figure 7B:
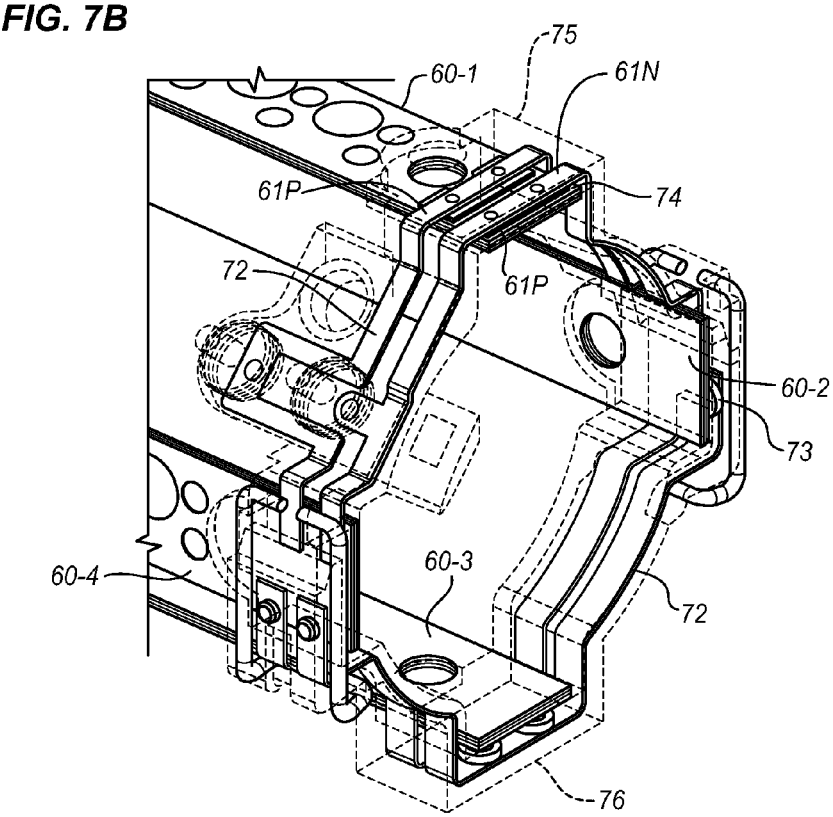

FIG. 6A and FIG. 6B are views of two versions of the Powered Rail 24, and FIG. 6C is an exploded view of the Powered Rail 24; FIGS. 7A and 7B illustrate the details of the Powered Rail 24 electrical interconnection; and FIGS. 8A-8C are illustrations of the typical mechanical interconnection and electrical interconnection of a Power-Consuming Accessory to the Handguard 23 and Powered Rail 24.

As noted above, the Powered Rail 24 comprises one or more Printed Circuit Board Assemblies (60-1 to 60-4) which are mounted in the apertures formed in a successive plurality of locking slots on the Powered Rail 24 to carry power to power-consuming accessories which are mounted on the Powered Rail 24 at various locations. The Printed Circuit Boards (60-1 to 60-4) are soldered to electrically conductive busses 72, 74. In addition, a conductive pin connector includes a terminal portion at one end which is pressed into the mating hole (not shown) in the interconnect electrical bus 72. Retaining clips 71 are manufactured from resilient metallic spring material, which are anchored on the upper rail connector 75; and a clamp hook feature 71 of the retaining clip is used to securely hold the lower rail connector 76 by engaging features formed on the lower rail connector 76. FIG. 7B illustrates the retaining clips 71 and electrically conductive busses 72 typically encapsulated in an insulative protective coating. The connector is removable and can be mounted easily through the retaining clips 71 which provide positive retention and a means of securing the connector halves. Mated connector pairs have tab features which captivate the clips.

FIGS. 6A and 6B illustrate the architecture of the Printed Circuit Board where remote power is applied via the positive connector contact 61P and the negative connector contact 61N. As shown in FIG. 6A, the power is routed by the electrical traces on the Printed Circuit Board 66. The positive current from positive connector contact 61P is routed to the center of the Printed Circuit Board switch (for example, 63-5) where it is switched via operation of the switch 68 (shown in FIG. 6C) to contact 63P-5, while the negative current from the negative connector contact 61N is routed to the negative bus 62N or negative bus contact pads (for example, 62N-3). The example shown in these figures provided thirteen positions where a power-consuming accessory can be attached and contact the power contacts of the Powered Rail 24. In particular, on both FIGS. 6A and 6B, there are thirteen positive contacts 62P-1 to 62P-13 (only several of which are numbered on the figures to avoid clutter). In FIG. 6A, a continuous negative buss 62N is provided as the other power source connection. In FIG. 6B, the negative power source connections are provided by thirteen individual negative bus contact pads 62N-1 to 62N-13 (only several of which are numbered on the figures to avoid clutter). On the printed circuit board 60A, there are points of attachment, typically comprising notches 64A and 64B, which are used to secure the printed circuit board in place in the corresponding slot of the Powered Rail 24 via a pin clip arrangement.

The positive 62P-3, 62P-10, 62P-13 (for example), and negative 62N-3, 62M-10, 62N-13 contacts (on FIG. 6B) can be continuously powered, especially in the case where only one set of contacts is provided, or can be switch activated by metallic snap dome switches 63-3, 63-10, 63-13 which are placed over positive common, and are in electrical contact with, the accessory positive switched contacts 62P-3, 62P-10, 62P-13. The metallic snap dome switch has a pair of conductive contacts which are normally in the open mode; when the cover of the metallic snap dome switch is depressed via a projection on the exterior surface of the power-consuming accessory which is mounted on the Powered Rail 24 juxtaposed to the metallic snap dome switch, these contacts mate and provide an electrical connection between positive common and a positive switched contact 62P. The metallic snap dome switch is a well-known component and consists of a curved metallic dome that spans two conductors (positive common and a positive switched contact 62P) such that when the dome is depressed, it snaps downward to electrically bridge the two conductors.

FIG. 6C illustrates an exploded view of the power distribution Printed Circuit Board assembly where a non-conductive layer 65 prevents the metal weapon Rail from electrically shorting the power distribution Printed Circuit Board 62. Spacer layer 63 is a non-conductive element which holds the snap dome switches in place so they do not move laterally during assembly. Metallic snap dome switches 68 provide the electrical switching action to mounted rail accessories. Top cover layer 65 provides environmental protection to the Printed Circuit Board 62 and the metallic snap dome switches 64 when the aforementioned layers are assembled.

Powered Accessory Mounting

FIGS. 1A-1H are illustrations of the Accessory Mounting Apparatus 800 which consists of a quick release clamp for mounting and securely attaching accessories to an accessory rail, such as Powered Rail 24. This apparatus allows for quick assembling and disassembling of accessories and tactical equipment to a weapon accessory rail system. The Accessory Mounting Apparatus 800 can be applied as a "grabber" or mounting device on a MIL-STD-1913 "Picatinny Rail" or a NATO 4694 "Accessory Rail" or other configured accessory rails, where the accessory rails can be powered or not. The Accessory Mounting Apparatus 800 can be adapted as a drop-in replacement for legacy rail mounts and "grabbers" being used with firearm accessories. For larger accessories, more than one of the Accessory Mounting Apparatus 800 can be linearly paired together to accommodate the larger size accessory.

The Accessory Mounting Apparatus 800 uses a quick release clamp for mounting and securely attaching accessories to, for example, a dove-tail shaped Powered Rail 24. The Accessory Mounting Apparatus 800 allows for quick assembling and disassembling of accessories and tactical equipment on a weapon accessory rail system. As shown in FIG. 1D, the Accessory Mounting Apparatus 800 consists of a base plate 809, a body 801, latching arm 803, and over-centered lever 802 to apply clamping force, where the body 801 of the Accessory Mounting Apparatus 800 is keyed to align with, for example, dove-tail shaped Powered Rail 24 and fix its location in the direction of the barrel 4 of the weapon 2. The latching arm 803 also is keyed to align with dove-tail shaped Powered Rail 24 and, to secure the accessory to the Powered Rail 24, it is slid over the dovetail in the Powered Rail 24 and the over-centered lever 802 is closed to clamp the Accessory Mounting Apparatus 800 securely around the Powered Rail 24, fixing it in all directions.

As shown in the exploded view of the Accessory Mounting Apparatus 800 illustrated in FIG. 1D, the base plate 809 provides a mounting surface to which an accessory is secured. A plurality of screws 810 are used to secure the base plate 809 to the body 801 of the Accessory Mounting Apparatus 800, and these screws 810 also can be used to secure the accessory to the base plate 809. There are numerous ways to secure the accessory to the base plate 809, including making the base plate 809 an integral part of the frame or housing of the accessory, or providing additional hardware to attach the accessory to the base plate 809 as is known in this field. A seating rim 808 is formed in body 801 to receive and align the base plate 809, and corners 806 are shaped to match the contours of the inside of the seating rim 808 of body 801.

Figure 1A:
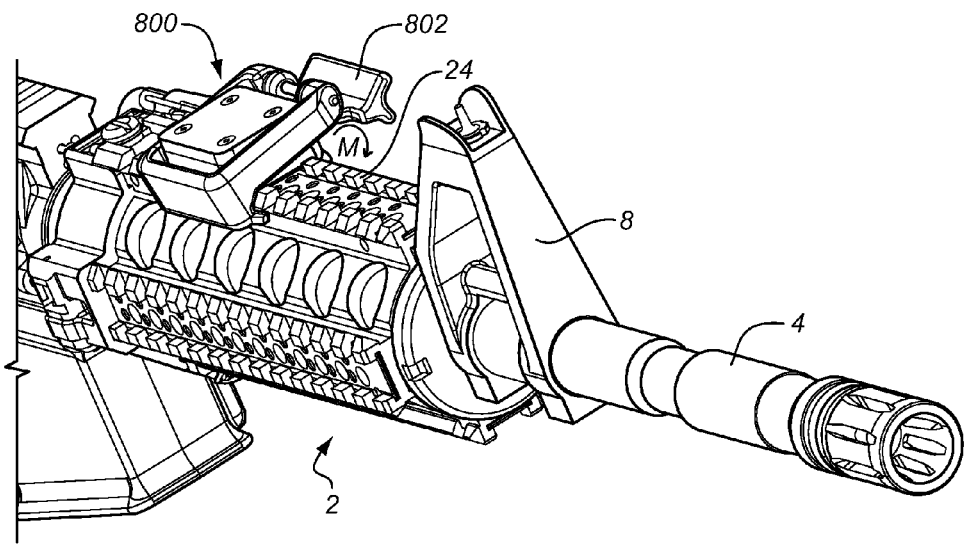
Figure 1B:
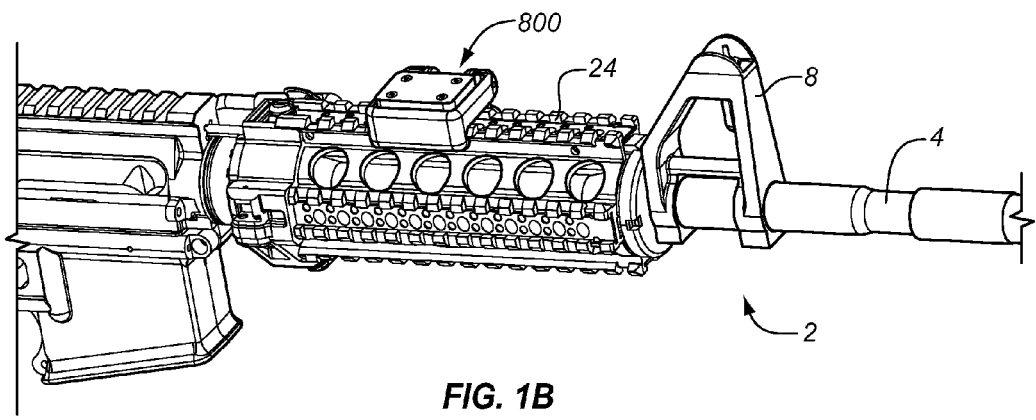
Figure 1E:
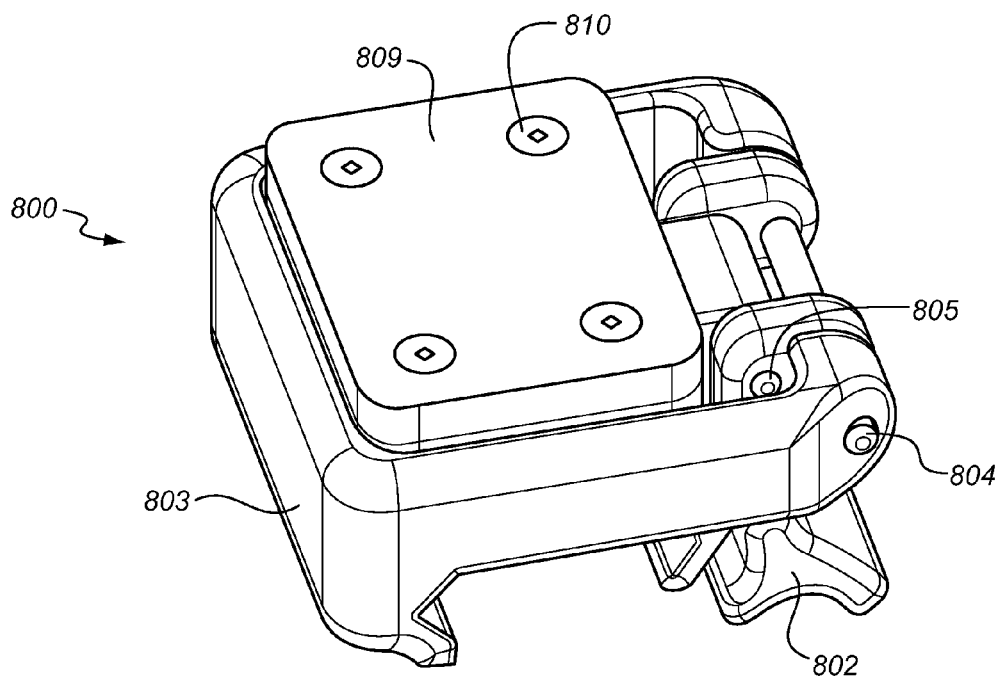
Figure 1F:
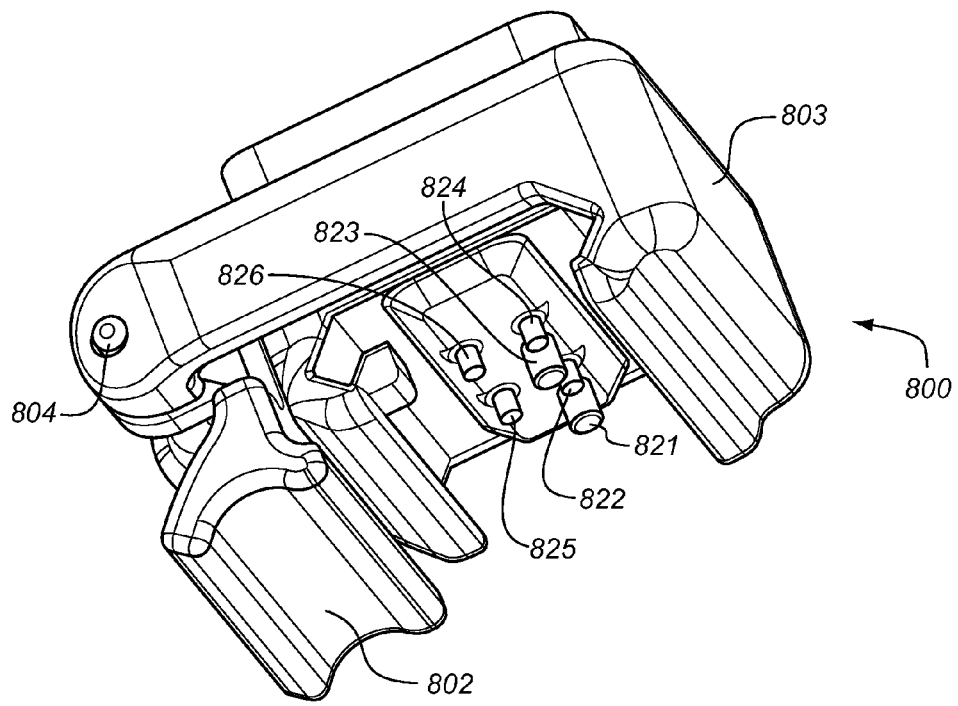
Figure 1G:
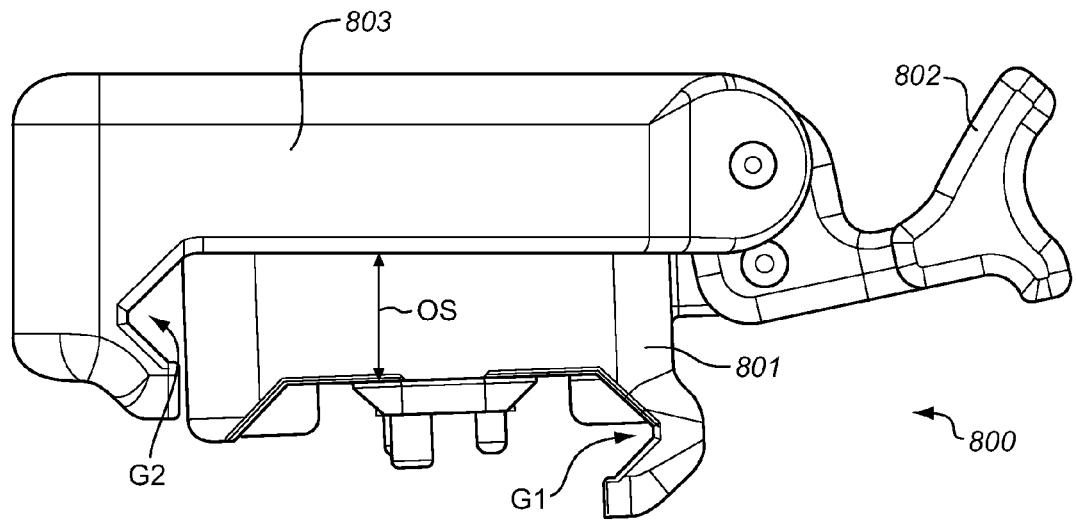
Figure 1H:
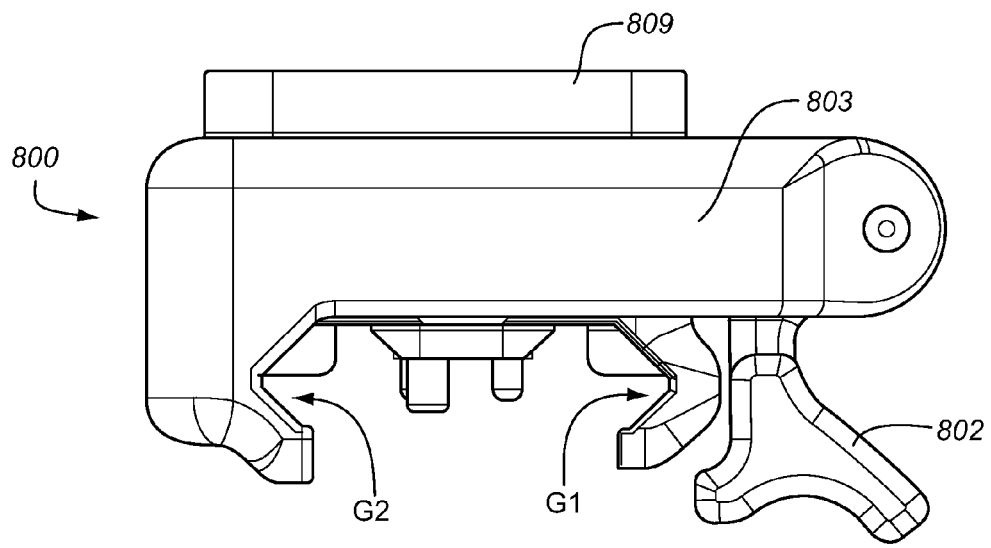

The accessory rail, such as Powered Rail 24, includes two outwardly-facing surfaces, one on each opposite side of the Powered Rail 24, having a predefined profile to enable Accessory Mounting Apparatus 800 to attach to and align with Powered Rail 24. Accessory Mounting Apparatus 800, therefore, includes two inwardly-facing surfaces of a size and shape to mate with the two outwardly-facing surfaces of the Powered Rail 24. FIG. 1G illustrates a first G1 of the two inwardly-facing surfaces which is formed in the body 801 of the Accessory Mounting Apparatus 800 to engage a first outwardly-facing surface of the Powered Rail 24. The second G2 inwardly-facing surface of the Accessory Mounting Apparatus 800 is formed on latching arm 803 and is movable with respect to the first G1 inwardly-facing surface of the Accessory Mounting Apparatus 800. Latching arm 803 is pivotally connected to the rail body 801 of the Accessory Mounting Apparatus 800 via pivot pin 805 and is keyed to align with, for example, dove-tail shaped Powered Rail 24 and fix its location in the direction of the barrel 4 of the weapon 2. The over-centered lever 802 is pivotally connected to the body 801 via pivot pin 804 and, when closed, it clamps the Accessory Mounting Apparatus 800 securely around the Powered Rail 24, fixing it in all directions.

In particular, as shown in FIG. 1G, prior to attachment to the Powered Rail 24, the two inwardly-facing surfaces G1 and G2 of Accessory Mounting Apparatus 800 are not in horizontal alignment and the bottom side of latching arm 803 is positioned above the bottom of body 801 a distance indicated by the arrow OS. To attach Accessory Mounting Apparatus 800 to Powered Rail 24, a user first places inwardly-facing surface G1 against a first side of the Powered Rail 24 and rotates latching arm 803 in the direction illustrated by arrow M in FIG. 1A thereby to position inwardly-facing surface G2 of latching arm 803 against a second side of the Powered Rail 24. Over-centered lever 802 then is moved from the open position illustrated in FIG. 1G to the closed position shown in FIG. 1H which results in the two inwardly-facing surfaces G1 and G2 of Accessory Mounting Apparatus 800 being in horizontal alignment and forced against their respective sides of the Powered Rail 24 as illustrated in FIGS. 1B, 1C, and 1E.

The Accessory Mounting Apparatus 800 thereby provides faster securement and detachment compared to traditional screw-based or lever-based rail mounts and "grabbers." The Accessory Mounting Apparatus 800 requires no tooling for rail securement or detachment.

When this Accessory Mounting Apparatus 800 is used with an electrified or Powered Rail 24, it supplies power to accessories such as a flashlight, target designator, or various powered sights. As illustrated in FIGS. 1D and 1F, a set of electrical contacts 822, 824-826 and switch activation pins 821, 823 (also noted as 807 on FIG. 1D) are provided to electrically interconnect with corresponding electrical contacts and switches, respectively, on the Powered Rail 24. Accessory Mounting Apparatus 800 can be mounted anywhere along the length of the Powered Rail 24 in any direction when not used to power accessories. The Accessory Mounting Apparatus 800 also can be used as a communication interface between rail communications and an attached accessory. The Accessory Mounting Apparatus 800 can be scaled for various dove-tail profiles that require quick securement or replacement such as mounting on vehicles (with integrated rails) or securing items temporarily on platforms.

SUMMARY

There has been described an Accessory Mounting Apparatus. It should be understood that the particular embodiments shown in the drawings and described within this specification are for purposes of example and should not be construed to limit the invention, which is described in the claims below. Further, it is evident that those skilled in the art may make numerous uses and modifications of the specific embodiment described without departing from the inventive concepts. Equivalent structures and processes may be substituted for the various structures and processes described; the subprocesses of the inventive method may, in some instances, be performed in a different order; or a variety of different materials and elements may be used. Consequently, the invention is to be construed as embracing each and every novel feature and novel combination of features present in and/or possessed by the apparatus and methods described.

What is claimed as new and desired to be protected by Letters Patent of the United States is:

1. A mounting apparatus for simultaneous mechanical and electrical attachment to a powered accessory rail, which extends along at least a portion of a length of a barrel of a weapon and which includes a plurality of slots formed along a length thereof and two outwardly-facing surfaces along opposite sides thereof, and which also has formed thereon a first electrical contact and a second electrical contact electrically connected to a power source for providing a first and a second electrical connection to the power source, wherein the powered accessory rail includes a switch formed thereon juxtaposed to the first and second electrical contacts for applying power from the power source to the first electrical contact when the switch is operated, comprising:

a body, comprising:
first and second electrical contacts formed on the bottom surface of the body to electrically contact the first and second electrical contacts of the powered accessory rail when the mounting apparatus is attached to the powered accessory rail,
a feature formed on and protruding from the bottom surface of the body for engaging the switch formed on the powered accessory rail and operating the electrical switch when the mounting apparatus is attached to the powered accessory rail,
an integral inwardly-facing surface having a profile that mates with a first of the outwardly-facing surfaces of the powered accessory rail, and
at least one keying feature to align with a corresponding one of the slots in the accessory rail;
a latching arm, pivotally connected to the body and having an inwardly-facing surface having a profile that mates with a second of the outwardly-facing surfaces of the powered accessory rail; and
a lever, pivotally connected to the body and operable to force the inwardly-facing surface of the body and the latching arm into mechanical contact with respective outwardly-facing surfaces of the accessory rail.

2. The mounting apparatus of claim 1 wherein the latching arm is pivotally connected to the body at a site above the integral inwardly-facing surface and overlays the top surface of the body.

3. The mounting apparatus of claim 2, further comprising:
a base plate attached to the top surface of the latching arm for attachment to a power consuming accessory.

4. The mounting apparatus of claim 1 wherein rotation of the lever about its pivotal connection to the body forces the latching arm and the integral inwardly-facing surface or profile of the body in a direction toward each other.

5. The mounting apparatus of claim 1 wherein the first and second electrical contacts of the powered accessory rail are formed in a slot and wherein attachment of the mounting apparatus on the powered rail simultaneously mechanically secures the mounting apparatus to the powered rail and electrically interconnects two electrical contacts on the mounting apparatus to the first and the second electrical contacts of the powered accessory rail.

6. A mounting apparatus for simultaneous mechanical and electrical attachment to a powered accessory rail, which extends along at least a portion of a length of a barrel of a weapon and which includes a plurality of slots formed along a length thereof and two outwardly-facing surfaces along opposite sides thereof, and which also has formed thereon a first electrical contact and a second electrical contact electrically connected to a power source for providing a first and a second electrical connection to the power source, wherein the powered accessory rail includes a switch formed thereon juxtaposed to the first and second electrical contacts for applying power from the power source to the first electrical contact when the switch is operated, comprising:
a body, comprising:
first and second electrical contacts formed on the bottom surface of the body to electrically contact the first and second electrical contacts of the powered accessory rail when the mounting apparatus is attached to the powered accessory rail,
a feature formed on and protruding from the bottom surface of the body for engaging the switch formed on the powered accessory rail and operating the electrical switch when the mounting apparatus is attached to the powered accessory rail,
an integral inwardly-facing surface to mate with a first of the outwardly-facing surfaces of the powered accessory rail, and
at least one keying feature to align with a corresponding one of the slots in the accessory rail;
a latching arm, pivotally connected to the body at a site above the integral inwardly-facing surface, overlaying the top surface of the body, and having an inwardly-facing surface to mate with a second of the outwardly-facing surfaces of the powered accessory rail; and
a lever, pivotally connected to the body and operable to force the inwardly-facing surface of the body and the latching arm into mechanical contact with respective outwardly-facing surfaces of the accessory rail.

7. The mounting apparatus of claim 6, further comprising:
a base plate attached to the top surface of the latching arm for attachment to a power consuming accessory.

8. The mounting apparatus of claim 6 wherein rotation of the lever about its pivotal connection to the body forces the latching arm and the integral inwardly-facing surface or profile of the body in a direction toward each other.

9. The mounting apparatus of claim 6 wherein the first and second electrical contacts of the powered accessory rail are formed in a slot and wherein attachment of the mounting apparatus on the powered rail simultaneously mechanically secures the mounting apparatus to the powered rail and electrically interconnects two electrical contacts on the mounting apparatus to the first and the second electrical contacts of the powered accessory rail.

* * * * *